(12) United States Patent
Athavale et al.

(10) Patent No.: US 11,238,031 B2
(45) Date of Patent: Feb. 1, 2022

(54) SYSTEMS AND METHODS OF METADATA MONITORING AND ANALYSIS

(71) Applicant: Walmart Apollo, LLC, Bentonville, AR (US)

(72) Inventors: Vilas Athavale, San Jose, CA (US); Swati Ajit Deshmukh, Cupertino, CA (US); Ravinder Matte, Mountain View, CA (US); Arun Viswanathan, Santa Clara, CA (US); Preksha Gupta, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 240 days.

(21) Appl. No.: 16/428,260

(22) Filed: May 31, 2019

(65) Prior Publication Data

US 2020/0379985 A1    Dec. 3, 2020

(51) Int. Cl.
*G06F 16/00* (2019.01)
*G06F 16/242* (2019.01)
*G06F 16/245* (2019.01)
*G06F 16/21* (2019.01)

(52) U.S. Cl.
CPC ......... *G06F 16/242* (2019.01); *G06F 16/212* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 7,373,350 B1 | 5/2008 | Arone et al. | |
| 7,814,470 B2* | 10/2010 | Mamou | G06F 16/254 |
| | | | 717/162 |
| 8,438,559 B2* | 5/2013 | Naslavsky | G06F 8/61 |
| | | | 717/174 |
| 8,583,769 B1* | 11/2013 | Peters | H04L 12/42 |
| | | | 709/221 |
| 9,009,277 B2* | 4/2015 | Peters | H04L 41/0813 |
| | | | 709/221 |
| 9,286,399 B2* | 3/2016 | Pingree | G06F 16/951 |

(Continued)

OTHER PUBLICATIONS

Universal Metadata Repository: Integrating Data Profiles Across an Organization, Abolhassani et al., IEEE (Year: 2018).*

*Primary Examiner* — Jean M Corrielus
(74) *Attorney, Agent, or Firm* — Duane Morris LLP; Manita Rawat (57) ABSTRACT

A system and method of generating platform-dependent queries from a platform-agnostic query are disclosed. A data pipeline comprising a plurality of events is implemented. Each event in the plurality of events has a set of platform-dependent metadata associated therewith and each of the plurality of events is processed by one of a plurality of ingestion platforms. Metadata associated with each of the plurality of events is stored in a combined metadata repository. The combined metadata repository stores metadata extracted from two or more platforms in a first repository. A platform-agnostic query configured to obtain one or more metadata search results from the platform-dependent metadata is received and deployed to the first repository within the combined metadata repository. The platform-agnostic query is configured to return a result set including metadata obtained from each of the two or more platforms.

20 Claims, 9 Drawing Sheets

(56) References Cited

U.S. PATENT DOCUMENTS

| | | | |
|---|---|---|---|
| 9,398,110 B2 * | 7/2016 | Boldyrev | H04L 67/2823 |
| 10,541,938 B1 * | 1/2020 | Timmerman | H04L 43/065 |
| 10,713,594 B2 * | 7/2020 | Szeto | G06F 11/1448 |
| 10,761,813 B1 | 9/2020 | Echeverria et al. | |
| 2009/0300181 A1 | 12/2009 | Marques | |
| 2013/0103734 A1 * | 4/2013 | Boldyrev | G06F 16/254 |
| | | | 709/201 |
| 2015/0088856 A1 | 3/2015 | Hunter et al. | |
| 2015/0127607 A1 * | 5/2015 | Savage | G06F 16/178 |
| | | | 707/610 |
| 2016/0055184 A1 | 2/2016 | Fokoue-Nkoutche et al. | |
| 2016/0294773 A1 | 10/2016 | Yu et al. | |
| 2017/0031659 A1 | 2/2017 | Burke et al. | |
| 2017/0060856 A1 | 3/2017 | Turtle et al. | |
| 2017/0199875 A1 * | 7/2017 | Nevrekar | G06F 40/186 |
| 2017/0364539 A1 | 12/2017 | Jacob et al. | |
| 2018/0167435 A1 | 6/2018 | Kinarti et al. | |
| 2019/0155802 A1 | 5/2019 | Miller et al. | |
| 2019/0182294 A1 * | 6/2019 | Rieke | G06F 16/2379 |
| 2019/0228093 A1 | 7/2019 | Falcao et al. | |
| 2019/0238635 A1 | 8/2019 | Ng et al. | |
| 2019/0258677 A1 | 8/2019 | Beedgen et al. | |
| 2019/0370369 A1 | 12/2019 | Kulkarni | |
| 2019/0392070 A1 * | 12/2019 | Johnson | G06F 16/2443 |

\* cited by examiner

SYSTEMS AND METHODS OF METADATA MONITORING AND ANALYSIS

TECHNICAL FIELD

This application relates generally to collection and analysis of streaming data and, more particularly, to streaming metadata collection and analysis.

BACKGROUND

Monitoring of data pipelines in networked environments, such as e-commerce or other networked environments, is essential for ensuring proper operation and health of the network. Current monitoring systems allow collection of metrics to provide health data for the network, publishing of metrics to a metric database, querying of the database, and presentation of the queried metrics to a user. Current monitoring systems are configured to handle input and metadata from known, independent sources using preselected ingestion platforms. Current system operate as data silos, isolating the specific metadata received from specific sources into individual repositories. Searching and operations are not possible across multiple repositories due to the isolated nature in which metadata is stored by current systems (e.g., individual silos).

Current metadata analysis systems do not provide adequate exploration tools for searching and operating on streaming data. Even when a metadata analysis tool has access to a relevant silo, current systems do not provide user-friendly mechanisms for connecting to streaming metadata for analysis. Current systems also lack adequate developer tools for processing and receiving new metadata from additional sources.

SUMMARY

In various embodiments, a system including a computing device is disclosed. The computing device is configured to implement a data pipeline comprising a plurality of events. Each event in the plurality of events has a set of platform-dependent metadata associated therewith and each of the plurality of events is processed by one of a plurality of ingestion platforms. The computing device is further configured to store metadata associated with each of the plurality of events in a combined metadata repository. The combined metadata repository stores metadata extracted from two or more platforms in a first repository. The computing device is further configured to receive a platform-agnostic query configured to obtain one or more metadata search results from the platform-dependent metadata and deploy the platform-agnostic query to the first repository within the combined metadata repository. The platform-agnostic query is configured to return a result set including metadata obtained from each of the two or more platforms.

In various embodiments, a non-transitory computer readable medium having instructions stored thereon is disclosed. The instructions, when executed by a processor cause a device to perform operations including implementing a data pipeline comprising a plurality of events. Each event in the plurality of events has a set of platform-dependent metadata associated therewith and each of the plurality of events is processed by one of a plurality of ingestion platforms. The instructions further cause the processor to store metadata associated with each of the plurality of events in a combined metadata repository. The combined metadata repository stores metadata extracted from two or more platforms in a first repository. The processor is configured to receive a platform-agnostic query configured to obtain one or more metadata search results from the platform-dependent metadata and deploy the platform-agnostic query to the first repository within the combined metadata repository. The platform-agnostic query is configured to return a result set including metadata obtained from each of the two or more platforms.

In various embodiments, a method is disclosed. The method includes a step of implementing a data pipeline comprising a plurality of events. Each event in the plurality of events has a set of platform-dependent metadata associated therewith, and wherein each of the plurality of events is processed by one of a plurality of ingestion platforms. Metadata associated with each of the plurality of events is stored in a combined metadata repository. The combined metadata repository stores metadata extracted from two or more platforms in a first repository. A platform-agnostic query configured to obtain one or more metadata search results from the platform-dependent metadata is received and deployed to the first repository within the combined metadata repository. The platform-agnostic query is configured to return a result set including metadata obtained from each of the two or more platforms.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

Figure 1:
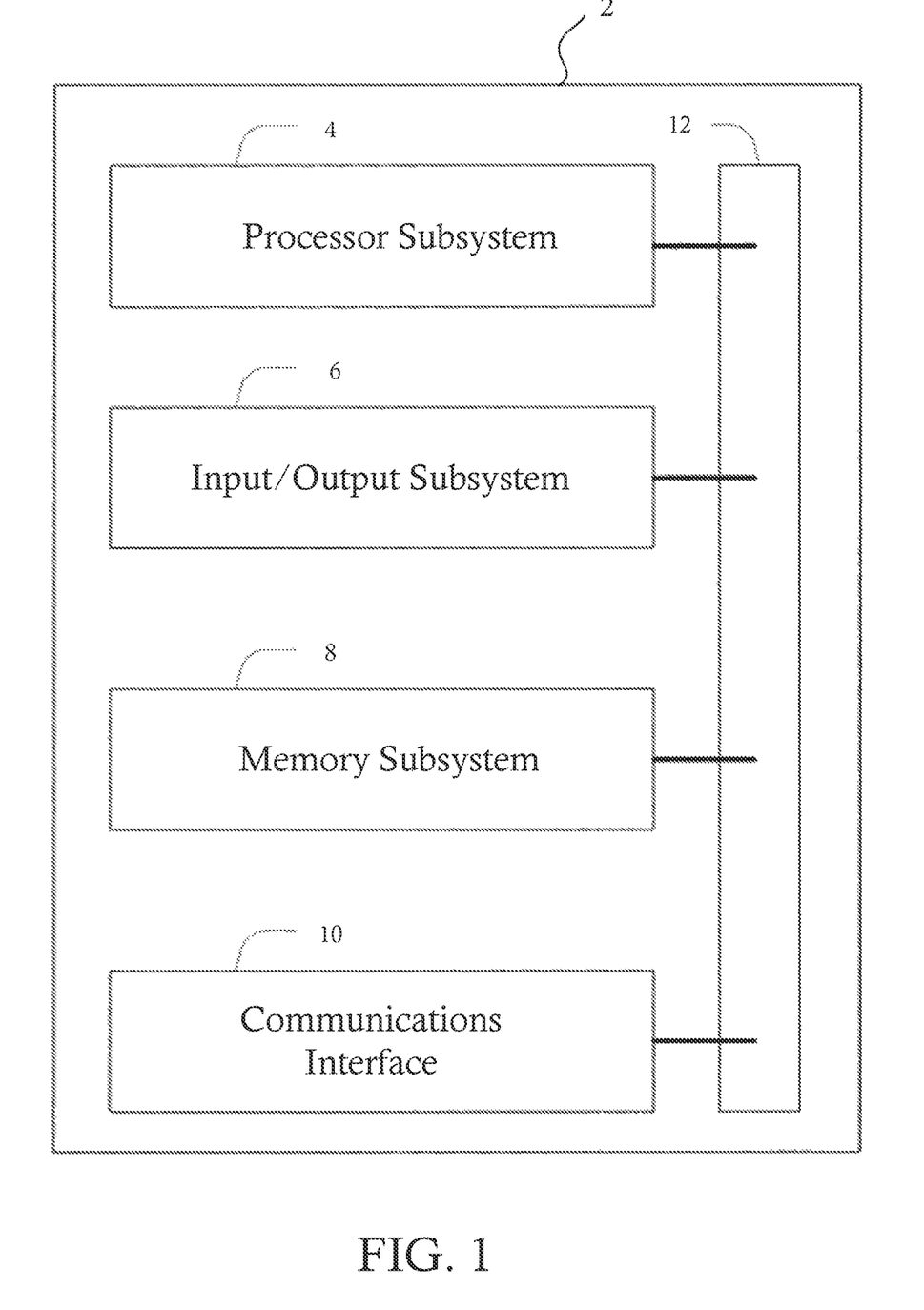
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including AB testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
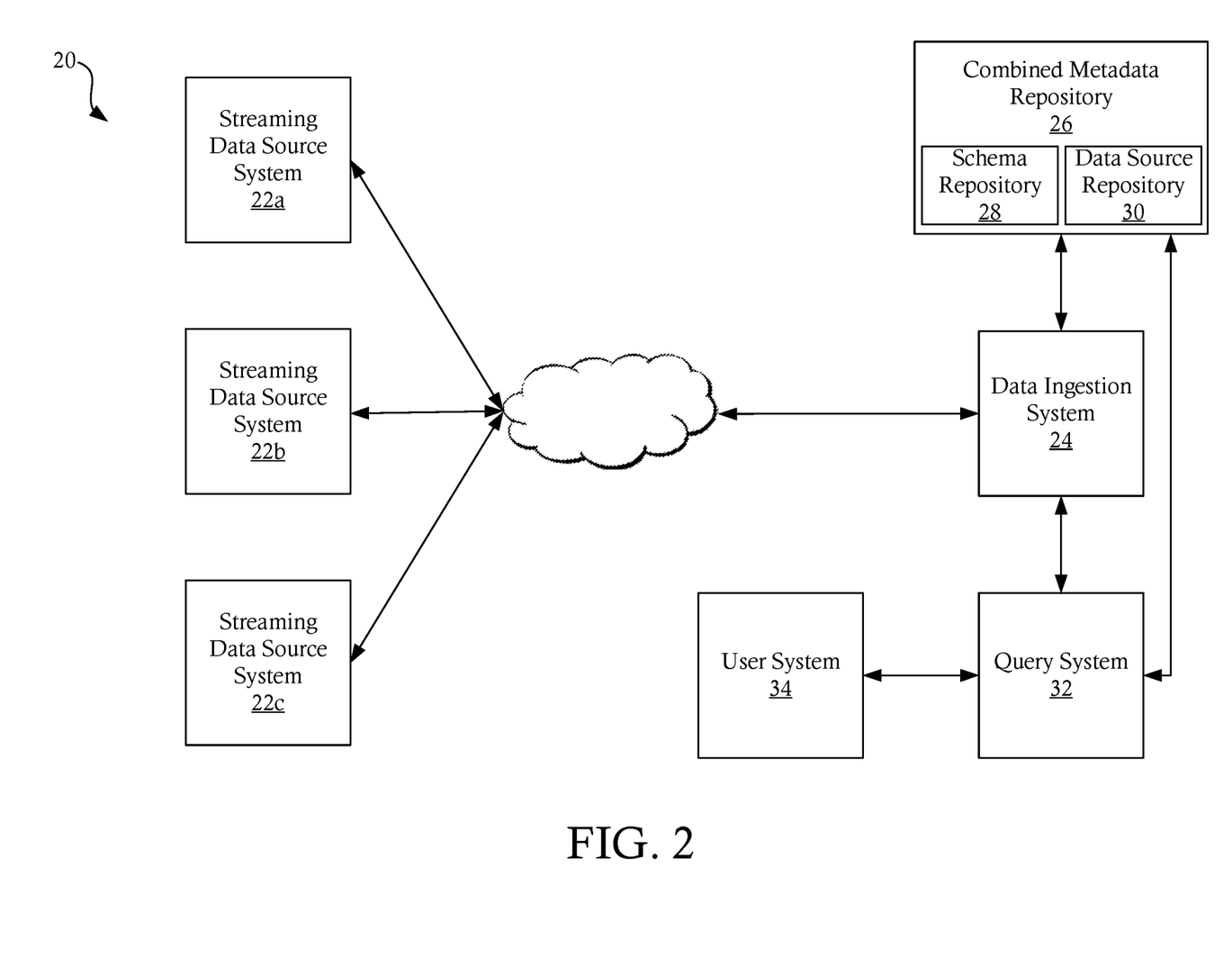
FIG. 2 illustrates a network configured to provide democratized metadata collection and analysis, in accordance with some embodiments.

FIG. 2 illustrates a network 20 configured to provide democratized metadata collection and analysis, in accordance with some embodiments. The network 20 includes a plurality of data sources 22a-22c providing streaming data including metadata. The streaming data may be related to services and/or products provided by an online portal, such as an e-commerce platform or other interface. The plurality of data sources 22a-22c provide streaming data (e.g., a data pipeline) to a data ingestion system 24. The data ingestion system 24 is configured to receive the streaming data from the plurality of data sources 22a-22c and provides a data ingestion frontend. As one example, in some embodiments, the data ingestion system 24 is configured to provide a distributed cache configured to receive and store each event generated by a data source system 22a-22c, although it will be appreciated that the disclosed systems and methods can be applied to any suitable systems.

Each event in the data pipeline includes metadata associated with the event. In some embodiments, the data ingestion system 24 is configured to store metadata associated with each event in the data pipeline in a combined metadata repository 26. The combined metadata repository 26 is configured to store all metadata for events received by the data ingestion system 24, regardless of the platform used to ingest the metadata, source of the metadata/events, etc. As described in greater detail below, in some embodiments, the combined metadata repository 26 includes a schema repository 28, a data source repository 30, and/or additional data repositories.

In some embodiments, a query system 32 is in signal communication with the combined metadata repository 26. The query system 32 is configured to execute platform-agnostic inquiries (or searches) of the metadata stored within the combined metadata repository 26. For example, in some embodiments, the query system 32 is in signal communication with one or more user systems 34. The user systems 34 provide one or more query parameters to the query system 32, which generates and executes a platform-agnostic query of the metadata repository 26. The platform-agnostic query may be generated in any suitable query language, such as, for example, SQL.

In some embodiments, the query system 32 is configured to generate platform-dependent queries and/or platform-dependent metric calculators from a platform-agnostic query. The platform-dependent metric calculators and/or platform-dependent queries may be deployed to one or more selected ingestion platforms implemented by the data ingestion system 24. As described in greater detail below, the query system 32 may be configured to convert a platform-agnostic query into one or more platform-dependent metric calculators for one or more identified target platforms. The target platforms may be identified based on a platform-agnostic query of the combined metadata repository 26. For example, in some embodiments, a platform-agnostic query is performed using a platform-agnostic query. For each result set identified by the platform-agnostic query, the query system 32 identifies a platform associated with the event that generated the metadata. The query system 32 converts the platform-agnostic query to a platform-dependent metric calculator for deployment to each platform identified by the platform-agnostic query of the combined metadata repository 26.

Figure 3:
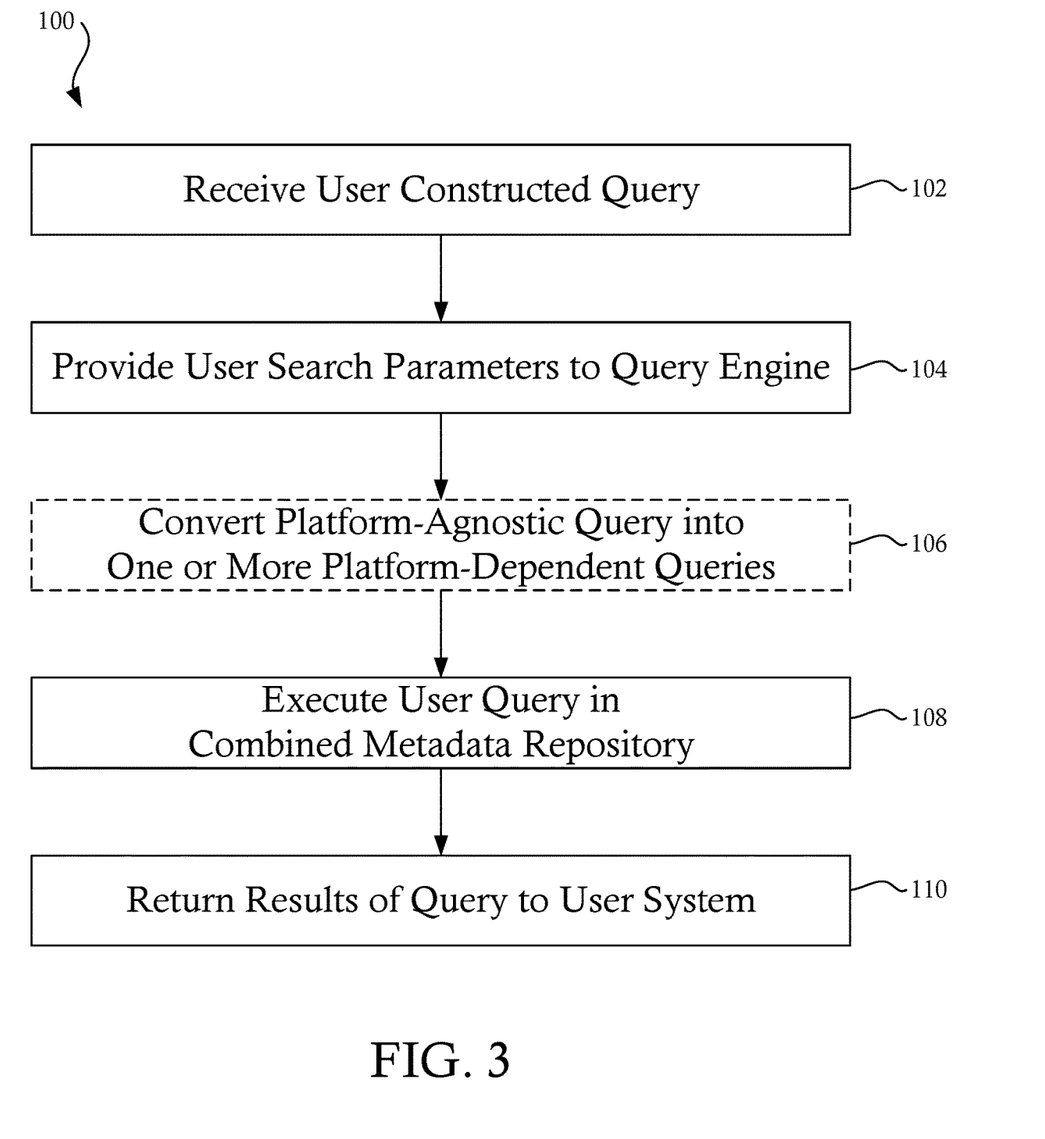
FIG. 3 illustrates a method of platform-agnostic querying within a combined metadata repository, in accordance with some embodiments.
Figure 4:
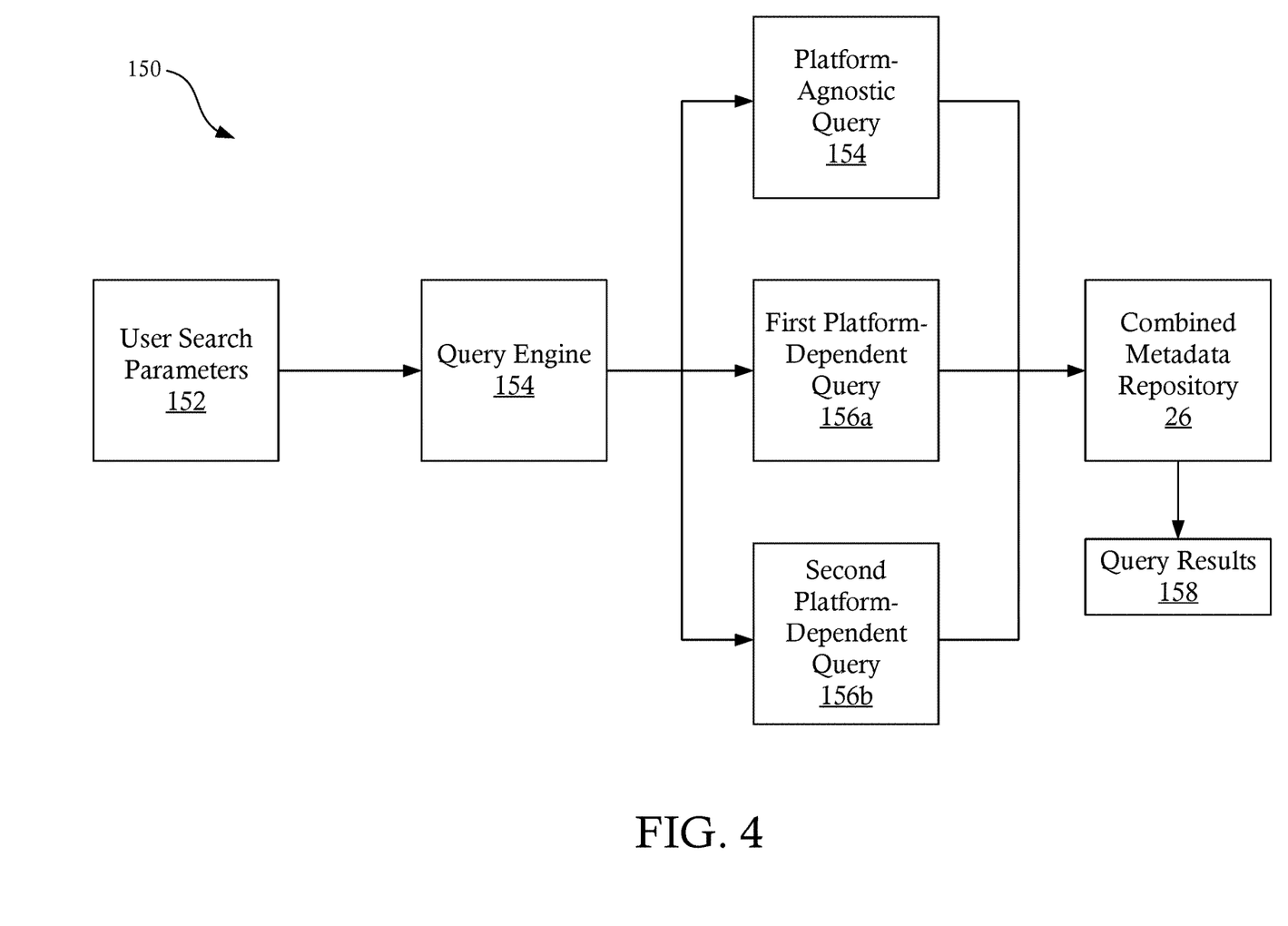
FIG. 4 illustrates a process flow of the method of platform-agnostic querying within a combined metadata repository illustrated in FIG. 3, in accordance with some embodiments.

FIG. 3 illustrates a method 100 of performing a platform-agnostic query of a combined metadata repository 26, in accordance with some embodiments. FIG. 4 illustrates a process flow 150 of the method 100, in accordance with some embodiments. At step 102, the query system 32 receives one or more user parameters 152 for a query (e.g., search) within the combined metadata repository 26. For example, user parameters 152 may be defined by a user using a user system 34 and may include known metadata tags or information, such as, for example, metadata associated with one or more data elements provided by a data pipeline. The user parameters 152 may be generated by the user using any suitable interface, such as, for example, a graphical user interface, a textual user interface, etc.

In some embodiments, the user system 34 is configured to provide a notebook query interface configured to guide a user in generation of one or more platform-agnostic queries. The notebook query interface may be configured to guide a user in creation of one or more queries, for example, by providing lists of metadata schemas, data sources, and/or other metadata, search terms, connectors, and/or other predetermined terms for constructing metadata searches. In some embodiments, and as discussed in greater detail below, the notebook query interface is configured to provide display results of one or more user-constructed searches.

At step 104, the user parameters are provided to a query engine 154 configured to generate a platform-agnostic query. The query engine 154 generates a platform-agnostic query 156 in a platform-agnostic language, such as, for example, SQL. In some embodiments, the query engine 154 is configured generate a platform-agnostic query 156 using standard and/or predetermined search terms and components, identified portions of a combined metadata repository 26 to be searched, metadata schema store din the combined metadata repository 26, and/or any other suitable elements. In some embodiments, the platform-agnostic query 156 is performed within the combined metadata repository 26 directly. In other embodiments, the platform-agnostic query 156 is converted into one or more platform-dependent queries 158a, 158b and performed within platform-dependent repositories and/or provided to targeted platforms for deployment.

For example, at optional step 106, the query engine 154 is configured to convert a platform-agnostic query 156 into one or more platform-dependent queries 158a, 158b. The query engine 154 may include one or more sets of conversion rules configured to convert the platform-agnostic query 156 to platform-dependent queries 158a, 158b. For example, in some embodiments, the query engine 154 may include a set of conversion rules for each data ingestion platform deployed within a network 20. Example ingestion platforms include, but are not limited to, Kafka, Haddop, Spark, Flink, Akka, Hive, K-SQL, and/or any other suitable ingestion system. In some embodiments, a single set of conversion rules may be configured to convert a platform-agnostic query 156 into multiple platform-dependent queries 158a, 158b.

At step 108, the query engine 154 executes the user query. The query engine 154 may directly execute the user query, for example, within the combined metadata repository 26 and/or may target platform-dependent and/or platform-associated databases. For example, as discussed above, the query engine 154 may convert a platform-agnostic query 154 to one or more platform-dependent queries 158a, 158b and provide a respective one of the platform-dependent queries 158a, 158b to a targeted platform for deployment.

At step 110, the results 160 of the user query are provided to the user system 34 for display to the user. In some embodiments, the results 160 of the user query are provided as a single result set to the user system 34 regardless of which platform, database, or search generated the results. For example, in some embodiments, the query engine 154 performs a platform-agnostic query 156 of the combined metadata database and also performs at least one platform-dependent query 158a, 158b generated from the platform-agnostic query 156. The results of the platform-agnostic query 156 and platform-dependent query 158*a*, 158*b* may be combined and provided to the user system 34 as a single result set 160.

In some embodiments, the user interface is configured to provide a graphical output to display the combined results 160 to a user. The results of the platform-agnostic query 156 provide a user with all relevant metadata in the combined metadata repository 26 regardless of which platform ingested, generated, processed, and/or otherwise interacted with the data. In some embodiments, a user can divide the results into platform-dependent and/or other categories based on one or more shared metadata schemas, elements, data, etc.

Figure 5:
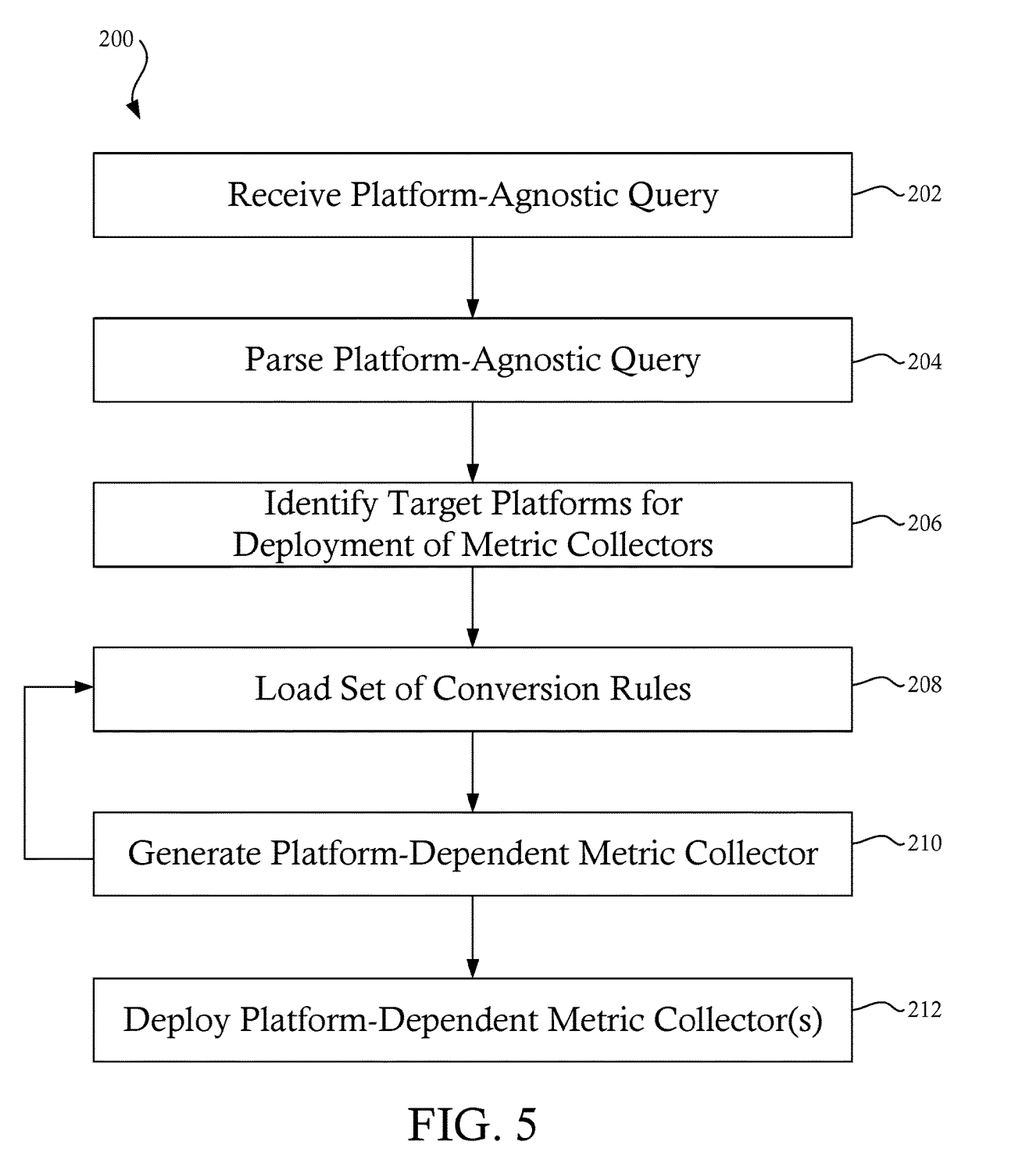
FIG. 5 illustrates a method for generating platform-dependent queries from platform-agnostic queries, in accordance with some embodiments.
Figure 6:
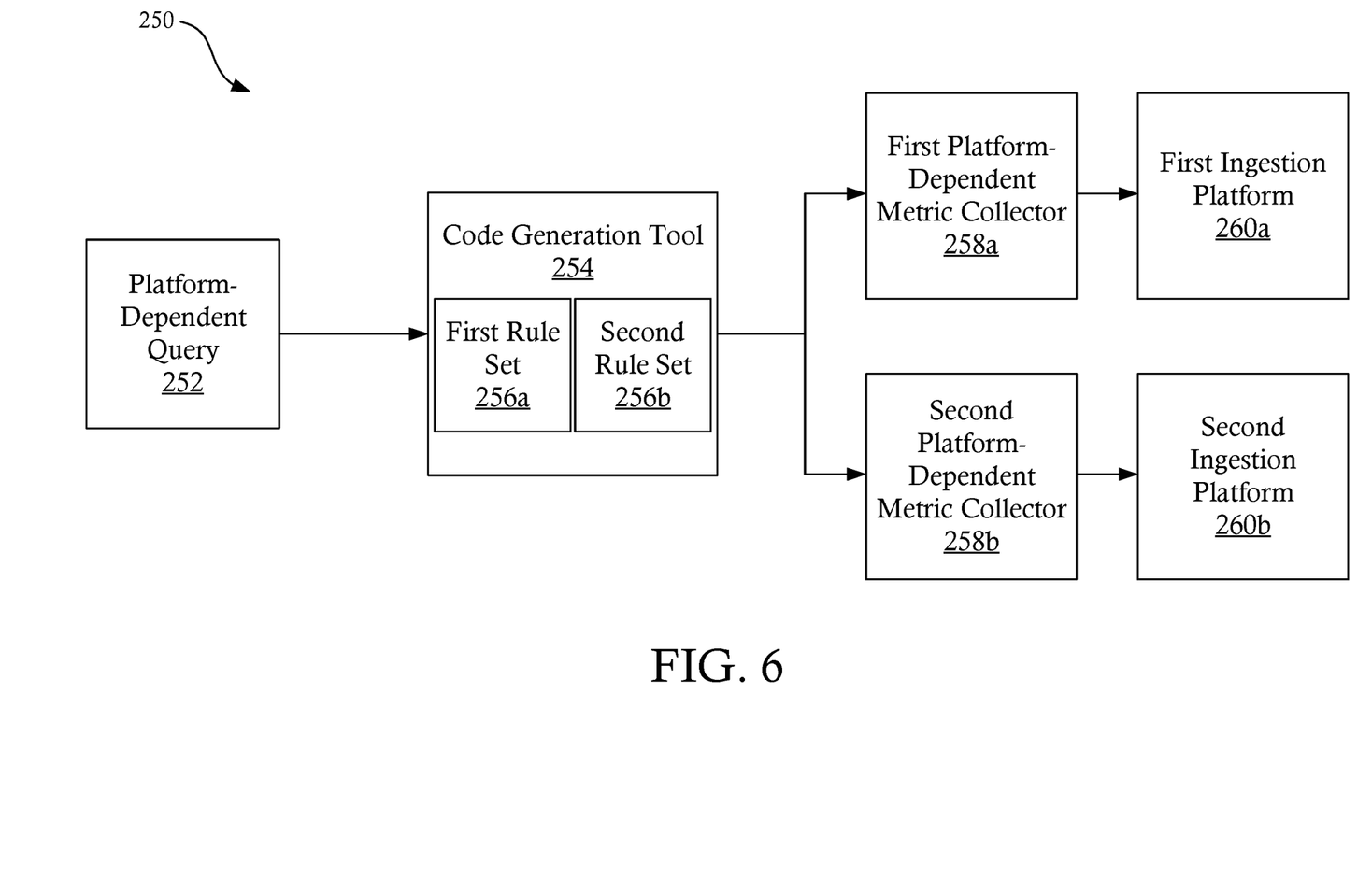
FIG. 6 illustrates a process flow of the method for generating platform-dependent queries from platform-agnostic queries illustrated in FIG. 5, in accordance with some embodiments

FIG. 5 illustrates a method 200 for generating platform-dependent metric calculators from platform-agnostic queries, in accordance with some embodiments. FIG. 6 illustrates a process flow 250 of the method 200, in accordance with some embodiments. At step 202, a platform-agnostic query 252 is received by a code generation tool 254. The platform-agnostic query 252 may be a user-generated query, a system-generated query, and/or any other suitable query. In some embodiments, the platform-agnostic query is implemented in a platform-agnostic language, such as, for example, SQL.

At step 204, the code generation tool 254 parses the platform-agnostic query 252 to identify each portion and/or section of the platform-agnostic query 252. The code generation tool 254 may parse the platform-agnostic query 252 using a parsing engine 260. The parsing engine 260 may be user defined, generated by machine learning, and/or otherwise defined. In some embodiments, the parsing engine 260 is configured to implement one or more predetermined parsing rules. For example, in various embodiments, the parsing engine 260 is configured to identify predetermined search terms, user defined parameters, metadata schema, and/or other known elements of a platform-agnostic query 252.

At step 206, the code generation tool 254 identifies one or more target platforms 262*a*, 262*b* for the platform-agnostic query 252. For example, in some embodiments, the platform-agnostic query 252 may include one or more identifiers for specific platforms identified by a user (for example, by exploring a combined metadata repository 26 using one or more platform-agnostic queries) (e.g., Flink, Kafka, etc.). As another example, in some embodiments, the code generation tool 254 is configured to review the platform-agnostic query and determine which platforms are targeted by the query. The code generation tool 254 may identify the targeted platform(s) from one or more metadata schemas targeted by the query, one or more metadata elements targeted by the query, one or more rules relating specific search terms and/or strings to one or more platforms, and/or any other suitable method of identifying a targeted platform. In some embodiments, the query system 32 executes a query of the combined metadata repository 26 using the platform-agnostic query 252 and identifies the platform associated with each result in the combined metadata repository 26. For example, in some embodiments, the platform-agnostic query 252 identifies one or more metadata schema, metadata elements, and/or other metadata elements stored in the combined metadata repository 26. After identifying a first targeted platform, the code generation tool 254 transitions to step 208.

At step 208, the code generation tool 254 loads a first set of conversion rules 256*a* associated with a first targeted platform 262*a*. The first set of conversion rules 256*a* are configured to convert the platform-agnostic query 252 into a platform-dependent metric calculator 258*a* configured for the first targeted platform 262*a*. In some embodiments, the first set of conversion rules 256*a* are configured to convert the platform-agnostic query 252 from a platform-agnostic language and/or structure into a platform-dependent language and/or structure that can be provided to the first targeted platform 262*a*. The first set of conversion rules 256*a* may be user defined and/or generated by one or more machine learning modules.

At step 210, the code generation tool 254 generates a first platform-dependent metric calculator 258*a*. The platform-dependent metric calculator 258*a* may be configured to provide real-time metric data to a user system 34 associated with the platform-agnostic query. In other embodiments, the platform-dependent metric calculator 258*a* is configured collected metric data to a database that is searchable by one or more systems, such as the user system 34. The platform-dependent metric calculator 258*a* includes platform-dependent commands and/or code that is generated according to the first set of conversion rules loaded by the code generation tool 254. After generation, the first platform-dependent metric calculator 258*a* may be provided to and/or stored in a platform control system (such as, for example, Github).

If more than one targeted platform was identified in step 206, the method 200 returns to step 208 and the code generation tool 254 loads a second set of conversion rules 256*b* associated with a second targeted platform 262*b*. The second set of conversion rules 256*b* are configured to convert the platform-agnostic query 252 into a platform-dependent metric calculator 258*b* configured for the second targeted platform 262*b*. In some embodiments, the second set of conversion rules 256*b* are configured to convert the platform-agnostic query 252 from a platform-agnostic language and/or structure into a platform-dependent language and/or structure that can be provided to the second targeted platform. The second set of conversion rules 256*b* may be user defined and/or generated by one or more machine learning modules. The method 200 proceeds again to step 210 and the code generation tool 254 generates a second platform-dependent metric calculator 258*b*.

The method 200 may iteratively execute steps 208 and 210 until a platform-dependent metric calculator 258*a*-258*b* has been generated for each targeted platform identified by the query system 32. After platform-dependent metric calculators 258-258*b* have been generated for each targeted platform, the platform-dependent metric calculators 258*a*-258*b* are deployed to respective targeted platforms 262*a*, 262*b*. The platform-dependent metric calculators 258*a*, 258*b* are connected to the data pipeline by the respective targeted platforms 262*a*, 262*b* and provide metric data to a user system 34, a database, and/or any other suitable system.

Figure 7:
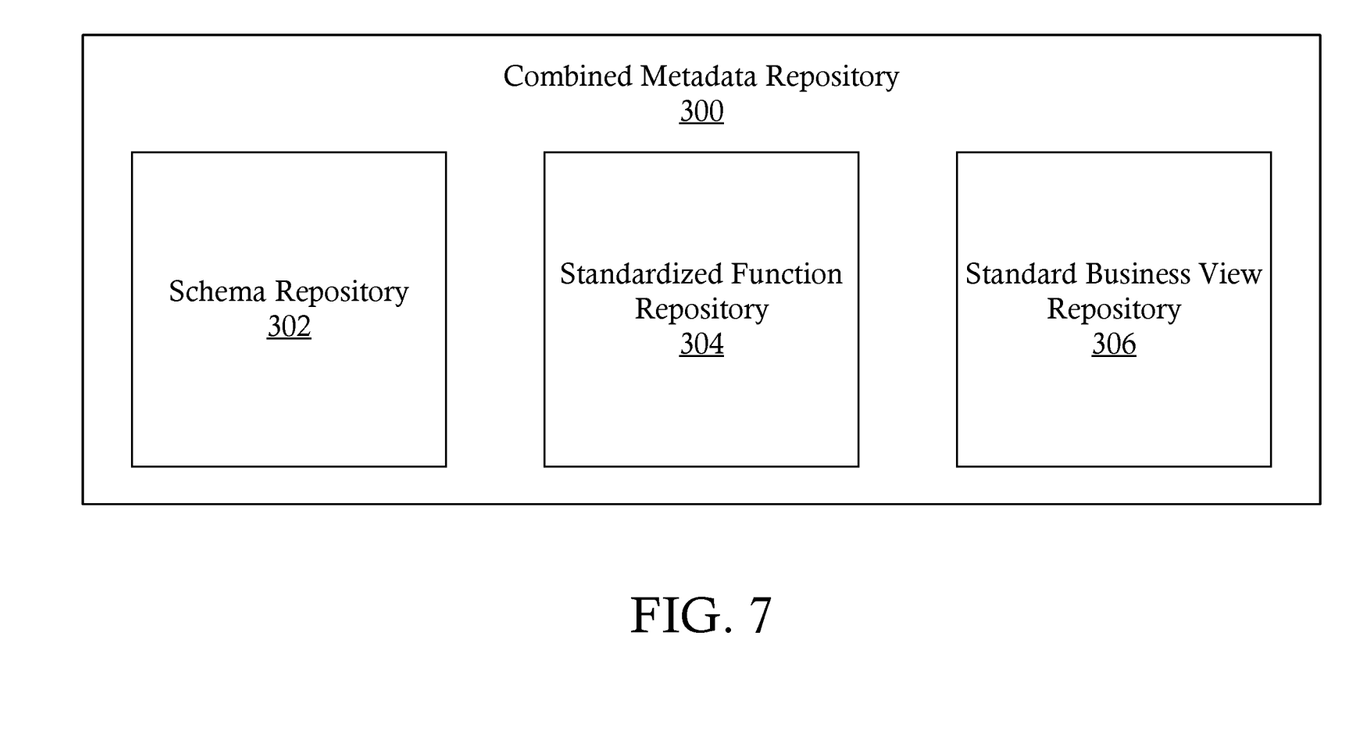
FIG. 7 illustrates a combined metadata repository, in accordance with some embodiments.

FIG. 7 illustrates a combined metadata repository 300, in accordance with some embodiments. The combined metadata repository 300 includes a plurality of sub-repositories 302-306. Each of the sub-repositories 302-306 is configured to store data extracted from the data pipeline and/or data for verifying extraction of metadata from the data pipeline. In some embodiments, the combined metadata repository 300 includes a schema repository 302 configured to store metadata schemas that can be received by and stored in the combined metadata repository 300. The schema repository 302 may include any suitable metadata or event schemas, such as, for example, one or more JSON schemas, AVRO schemas, XML schemas, custom schemas, Protobuf schemas, CSV/TSV schemas, and/or any other suitable schemas.

In some embodiments, the combined metadata repository 300 includes a standardized function (UDF) repository 304.

The UDF repository 304 is configured to store standard metadata functions configured for operation on metadata extracted from events in the data pipeline. The UDF repository 304 may include platform-neutral functions, schema-specific functions, and/or any other suitable metadata functions. Although specific embodiments are discussed herein, it will be appreciated that any suitable metadata may be stored in any suitable sub-repository of the combined metadata repository 300 and is within the scope of this disclosure.

In some embodiments, the combined metadata repository 300 includes a standard business views repository 306 configured to store one or more standard metric outputs ("business views") configured to allow review of metadata information stored in the combined metadata repository 300.

The metadata stored in the combined metadata repository 300 and/or any sub-repository 302-306 may be extracted from the data pipeline using one or more processing platforms (e.g., Kafka, Flink, etc.) and/or may be user defined (e.g., endpoints, list of functions, etc.). The combined metadata repository 300 collects metadata from all potential sources in single location enabling cross-platform searching of metadata during exploration, as discussed in greater detail below with respect to FIG. 9.

Figure 8:
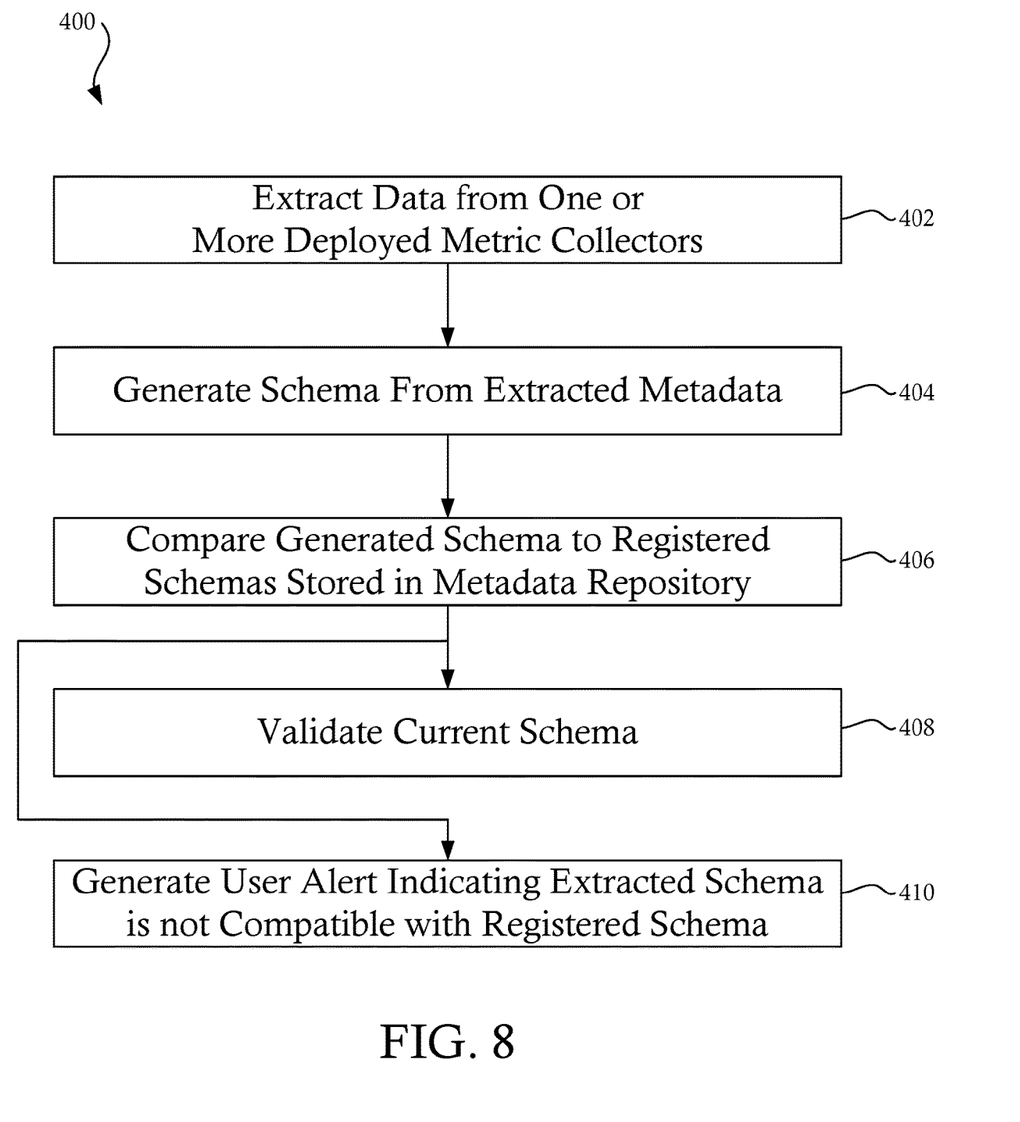
FIG. 8 illustrates a method of metadata schema validation, in accordance with some embodiments.

In some embodiments, the query system 32 is configured to perform metadata schema validation. FIG. 8 illustrates a method 400 of metadata schema validation, in accordance with some embodiments. At step 402, the query system 32 extracts data from one or more deployed metric calculators (i.e., obtains data from a messaging system). At step 404, the query system 32 generates a schema for the extracted metadata. The schema may be generated based on one or more schema generation rules stored by the query system 32. The schema generation rules may be user defined and/or may be generated by one or more machine learning processes.

At step 406, the query system 32 compares the generated schema to the registered schemas stored in the combined metadata repository 300, such as, for example, schemas stored in the schema repository 302. If the schema matches and/or is backward compatible with at least one registered schema stored in the combined metadata repository 300, the method 400 proceeds to step 408, and the current schema is validated. If the schema does not match and is not backward compatible with any schema in the combined metadata repository 300, the method proceeds to step 410. At step 410, the query system 32 generates an alert to the user system 34 indicating that the extracted schema is not compatible with the registered schema and prompts the user to generate a new query compatible with the registered schema.

Figure 9:
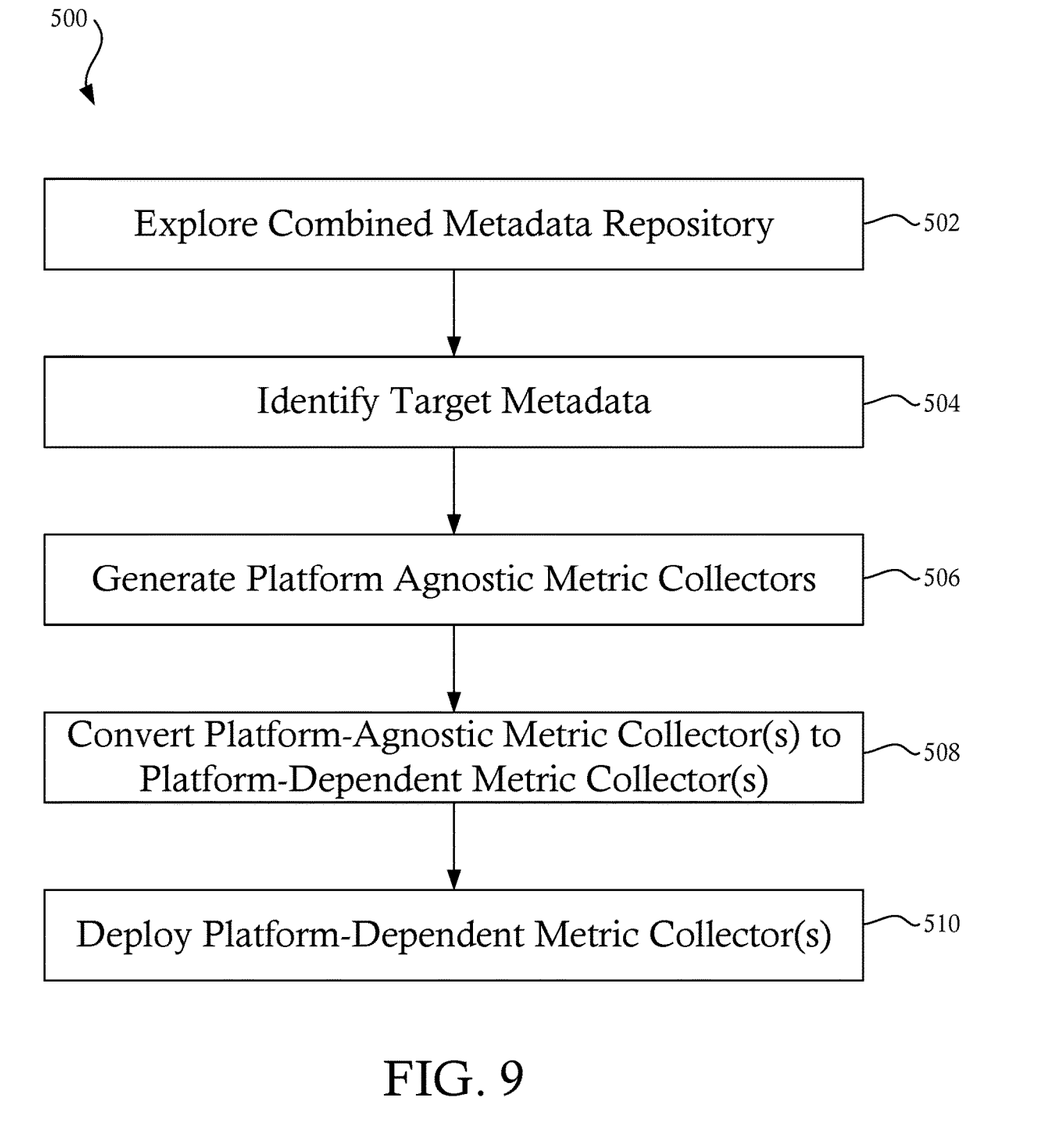
FIG. 9 illustrates a method of generating and deploying metric calculators using a combined metadata repository, for example, as illustrated in FIG. 7, in accordance with some embodiments.

FIG. 9 illustrates a method of generating and deploying metric calculators using a combined metadata repository 300, for example, as illustrated in FIG. 7, in accordance with some embodiments. At step 502, a user interacts with a user system 34 to perform exploration of the combined metadata repository. Exploration can include executing one or more platform-agnostic searches to identify metadata relevant to a user inquiry. For example, in some embodiments, a user system 34 may generate one or more user queries which are converted into platform-agnostic queries as discussed above with respect to FIG. 3. In some embodiments, the query system 32 generates one or more platform-dependent queries for one or more platforms.

At step 504, the user reviews the exploration results and identifies one or more metadata schema, terms, elements, etc. for monitoring and/or metric calculation. The user may interact with the query results using a user interface configured to provide visualization of the results of the user queries, such as, for example, a graphical user interface, a notebook user interface, etc.

At step 506, the user generates one or more platform-agnostic metric calculators based on the received exploration results. In some embodiments, platform-agnostic metric calculators are generated using the user interface to construct one or more platform-agnostic queries. For example, a platform-agnostic metric calculator may be generated using the same interface configured to generate platform-agnostic queries during step 502 and/or a separate user interface.

At step 508, the query system 32 converts the platform-agnostic metric calculator 560 into one or more platform-dependent metric calculators. The platform-dependent metric calculators may be generated according to the method 200 discussed above with reference to FIG. 5. At step 510, the platform-dependent metric calculators are deployed to the data pipeline by the targeted platforms. Each of the platform-dependent metric calculators provides a selected set of metrics to the user system 34. In some embodiments, the extracted metrics are provided to the combined metadata repository 26 and the user system 34 may be configured to obtain the extracted metrics from the combined metadata repository 26.

Although the subject matter has been described in terms of exemplary embodiments, it is not limited thereto. Rather, the appended claims should be construed broadly, to include other variants and embodiments, which may be made by those skilled in the art.

What is claimed is:

1. A system for generating item recommendations, comprising:
    a memory having instructions stored thereon, and a processor configured to read the instructions to:
        implement a data pipeline comprising a plurality of events, wherein each event in the plurality of events has a set of platform-dependent metadata associated therewith, and wherein each of the plurality of events is processed by one of a plurality of ingestion platforms;
        store metadata associated with each of the plurality of events in a combined metadata repository, wherein the combined metadata repository stores metadata extracted from two or more platforms in a first repository;
        receive a platform-agnostic query configured to obtain one or more metadata search results from the platform-dependent metadata; and
        deploy the platform-agnostic query to the first repository within the combined metadata repository, wherein the platform-agnostic query is configured to return a result set including metadata obtained from each of the two or more platforms.

2. The system of claim 1, wherein the combined metadata repository comprises a schema repository.

3. The system of claim 2, wherein the processor is configured to read the instructions to:
    extract a first set of metadata from the data pipeline, wherein the first set of metadata is associated with a first platform;
    generate a metadata schema for the first set of metadata; and
    compare the generated metadata schema to a plurality of stored metadata schemas maintained by the combined metadata repository.

4. The system of claim 1, wherein the processor is configured to read the instructions to generate a first platform-dependent query from the platform-agnostic query, wherein the first platform-dependent query is configured to be deployed to the first repository.

5. The system of claim 4, wherein the first platform-dependent query is generated by applying a first set of conversion rules to the platform-agnostic query.

6. The system of claim 1, wherein the processor is configured to read the instructions to:
receive one or more user query parameters; and
generate the platform-agnostic query in a predetermined platform-agnostic language.

7. The system of claim 6, wherein the platform-agnostic language is SQL.

8. A non-transitory computer readable medium having instructions stored thereon, wherein the instructions, when executed by a processor cause a device to perform operations comprising:
implementing a data pipeline comprising a plurality of events, wherein each event in the plurality of events has a set of platform-dependent metadata associated therewith, and wherein each of the plurality of events is processed by one of a plurality of ingestion platforms;
storing metadata associated with each of the plurality of events in a combined metadata repository, wherein the combined metadata repository stores metadata extracted from two or more platforms in a first repository;
receiving a platform-agnostic query configured to obtain one or more metadata search results from the platform-dependent metadata; and
deploying the platform-agnostic query to the first repository within the combined metadata repository, wherein the platform-agnostic query is configured to return a result set including metadata obtained from each of the two or more platforms.

9. The non-transitory computer readable medium of claim 8, wherein the combined metadata repository comprises a schema repository.

10. The non-transitory computer readable medium of claim 9, wherein the instructions when executed by the processor cause the device to perform further operations comprising:
extracting a first set of metadata from the data pipeline, wherein the first set of metadata is associated with a first platform;
generating a metadata schema for the first set of metadata; and
comparing the generated metadata schema to a plurality of stored metadata schemas maintained by the combined metadata repository.

11. The non-transitory computer readable medium of claim 8, wherein the instructions when executed by the processor cause the device to perform further operations comprising generating a first platform-dependent query from the platform-agnostic query, wherein the first platform-dependent query is configured to be deployed to the first repository.

12. The non-transitory computer readable medium of claim 11, wherein the first platform-dependent query is generated by applying a first set of conversion rules to the platform-agnostic query.

13. The non-transitory computer readable medium of claim 8, wherein the instructions when executed by the processor cause the device to perform further operations comprising:
receiving one or more user query parameters; and
generating the platform-agnostic query in a predetermined platform-agnostic language.

14. The non-transitory computer readable medium of claim 13, wherein the platform-agnostic language is SQL.

15. A method, comprising:
implementing a data pipeline comprising a plurality of events, wherein each event in the plurality of events has a set of platform-dependent metadata associated therewith, and wherein each of the plurality of events is processed by one of a plurality of ingestion platforms;
storing metadata associated with each of the plurality of events in a combined metadata repository, wherein the combined metadata repository stores metadata extracted from two or more platforms in a first repository;
receiving a platform-agnostic query configured to obtain one or more metadata search results from the platform-dependent metadata; and
deploying the platform-agnostic query to the first repository within the combined metadata repository, wherein the platform-agnostic query is configured to return a result set including metadata obtained from each of the two or more platforms.

16. The method of claim 15, wherein the combined metadata repository comprises a schema repository.

17. The method of claim 16, comprising:
extracting a first set of metadata from the data pipeline, wherein the first set of metadata is associated with a first platform;
generating a metadata schema for the first set of metadata; and
comparing the generated metadata schema to a plurality of stored metadata schemas maintained by the combined metadata repository.

18. The method of claim 15, comprising generating a first platform-dependent query from the platform-agnostic query, wherein the first platform-dependent query is configured to be deployed to the first repository.

19. The method of claim 18, wherein the first platform-dependent query is generated by applying a first set of conversion rules to the platform-agnostic query.

20. The method of claim 15, comprising:
receiving one or more user query parameters; and
generating the platform-agnostic query in a predetermined platform-agnostic language.

* * * * *